United States Patent [19]
Moore

[11] Patent Number: 5,733,494
[45] Date of Patent: Mar. 31, 1998

[54] METHODS OF MAKING PREFORMS FOR RESIN TRANSFER MOLDING

[75] Inventor: John H. Moore, Waterford, Mich.

[73] Assignee: APX International, Madison Heights, Mich.

[21] Appl. No.: 774,620

[22] Filed: Dec. 30, 1996

Related U.S. Application Data

[63] Continuation of Ser. No. 409,972, Mar. 24, 1995, abandoned.

[51] Int. Cl.$^6$ ............................................. B29C 3/10
[52] U.S. Cl. ..................... 264/258; 264/86; 264/257; 264/333; 156/166; 156/246; 156/540
[58] Field of Search ...................... 156/42, 166, 231, 156/246, 540; 264/257, 258, 87, 333, 86; 162/210, 222, 157 R

[56]  References Cited

U.S. PATENT DOCUMENTS

| | | | |
|---|---|---|---|
| 665,747 | 1/1901 | Martin | 427/282 |
| 2,763,575 | 9/1956 | Bede | 117/104 |
| 2,861,897 | 11/1958 | Hendrixson | 117/47 |
| 3,042,547 | 7/1962 | Pickett | 117/102 |
| 3,073,721 | 1/1963 | Pokorny | 117/105.1 |
| 3,791,783 | 2/1974 | Damon et al. | 425/82 |
| 3,911,178 | 10/1975 | McDowell et al. | 427/316 |
| 4,011,195 | 3/1977 | Self | 260/40 R |
| 4,138,513 | 2/1979 | Srock et al. | 427/371 |
| 4,265,936 | 5/1981 | Prohaska, Jr. | 427/140 |
| 4,327,131 | 4/1982 | Branovich et al. | 427/229 |
| 4,330,444 | 5/1982 | Pollman | 523/404 |
| 4,344,804 | 8/1982 | Bijen et al. | 156/42 |
| 4,395,441 | 7/1983 | Farnam | 427/211 |
| 4,456,804 | 6/1984 | Lasky et al. | 219/10.43 |
| 4,659,412 | 4/1987 | Newman et al. | 156/322 |
| 4,690,837 | 9/1987 | Doroszkowski et al. | 427/314 |
| 4,731,262 | 3/1988 | Ohno et al. | 427/379 |
| 4,908,231 | 3/1990 | Nelson et al. | 427/55 |
| 4,919,977 | 4/1990 | Yamane et al. | 427/379 |
| 4,933,214 | 6/1990 | Sugiura et al. | 427/379 |
| 4,943,477 | 7/1990 | Nelson et al. | 427/55 |
| 4,968,530 | 11/1990 | Yamane et al. | 427/142 |
| 5,066,536 | 11/1991 | Cogswell et al. | 428/216 |
| 5,091,215 | 2/1992 | Tanimoto et al. | 427/240 |
| 5,130,173 | 7/1992 | Barten et al. | 427/314 |
| 5,219,642 | 6/1993 | Meakin et al. | 428/212 |

OTHER PUBLICATIONS

Editorial by Michael C. Gabrielle, Associate Editor, "RTM Composites, What the Viper Project Taught Us", Plastics Technology (Mar. 1994).

*Primary Examiner*—Merrick Dixon
*Attorney, Agent, or Firm*—Harness, Dickey & Pierce, P.L.C.

[57]  ABSTRACT

Improvements relating to composite materials. In a first aspect of the invention a distinctive and a less costly RTM preform is provided, along with a method of making it. In a second aspect of the invention, a distinctive preheating of an RTM preform provide enhanced surfaces on RTM composite articles.

9 Claims, 3 Drawing Sheets

METHODS OF MAKING PREFORMS FOR RESIN TRANSFER MOLDING

RELATED PATENT APPLICATION

This is a continuation of U.S. patent application Ser. No. 08/409,972 filed Mar. 24, 1995, now abandoned.

This application is related to my U.S. patent application Ser. No. 08/409,975 filed Mar. 25, 1995, U.S. Pat. No. 5,624,037, attorney docket number 7946-00003, entitled "A Method of Minimizing Defects in Painted Composite Material Products", filed on or about the filing date of this application and assigned to the assignee of this application. The disclosure of the above related patent application is incorporated herein by reference.

BACKGROUND OF THE INVENTION

1. Field of the Invention

This invention relates to the transfer molding of composite plastic articles. More specifically, this invention relates to forming a less expensive continuous fiber reinforcing preform for transfer molded (RTM) articles.

2. Description of the Prior Art

Resin transfer molding (RTM) is a process for making fiber reinforced composite articles. RTM involves premolding a preform of reinforcing fibers, disposing the preform in a mold, and then injecting plastic into the mold to form the finished article.

The RTM preform is most usually reinforced with fibers of glass. The glass fibers can be in the form of a woven sheet, a substantially continuous fiber sheet, or a non-woven mat of relatively short fibers ("directed" fibers). The sheet is generally impregnated with a plastic, to allow the sheet to be molded to a predetermined shape.

One or more sheets of woven reinforcing material, such as glass cloth, can provide considerable reinforcement in a composite article. However, woven reinforcing material does not stretch much, especially the denser weaves. As a result, woven reinforcing material is not generally preferred for preforms that have significant curvature, including relatively high hills and/or deep valleys. It "gathers" too much around such curves, hills and/or valleys.

Accordingly, it is customary to make RTM preforms of such curvatures with mats or sheets of non-woven material, as for example continuous filament or "directed" glass fiber sheets or mats. The directed glass fibers are short lengths of glass fibers that are chopped from continuous filaments into fiber lengths of about one to two inches. The short lengths are blown onto a pattern or mold surface, where they accumulate to form a layer. The pattern or mold surface can have a plurality of pores, that communicate with a source of vacuum, to assist in build-up and densification of the layer. Since the fibers are relatively short, the layer they comprise can readily fairly uniformly conform to a complex three dimensional shape.

The chopped fibers are coated with a thermoplastic resin, to serve as a binder in the RTM preform. The thermoplastic resin can be applied to the continuous filaments before chopping, or sprayed onto the shaped layer after it is formed. Applying heat to the layer of chopped fibers causes the thermoplastic to fuse. After cooling, the layer becomes self supporting and can be removed from the pattern or mold on which it was formed, to yield a preform of reinforcing fibers.

Usually, is preferred that the density of the layer be increased, by compressing the layer against the pattern while the fibers are still hot. The compressed layer will impart greater strength to the composite product in which it is used. Often, the layer is compressed to the same thickness as the composite product in which the preform is molded.

When the relatively short, i.e., "directed", fibers are used to make the RTM preform, fiber "wash out" can occur in the gate area of the RTM mold. "Wash out", as used herein, means that the short fibers comprising the RTM preform move away from the gate area during injection of the thermosetting plastic into the RTM mold. The plastic, and/or the mold, is usually hot during the injection, which tends to soften, if not melt the thermoplastic resin temporary binder of the RTM preform. Accordingly, the thermoplastic binder of the preform is weakened at the time the thermosetting resin is injected into the RTM mold. It is to be recognized that the chopped fibers of the preform are relatively short, and that the preform substantially fills the thickness of the RTM mold cavity. Accordingly, the injection of thermosetting resin into the RTM mold can wash away fibers from injection, i.e., gate, areas of the RTM mold. This leaves the gate areas of the finished composite part un-reinforced, and an adjacent area too strongly reinforced. Such a result is objectionable.

Various molding techniques have been used to reduce fiber "wash out" in the composite part. In addition, "wash out" can be minimized by making the RTM preform form sheets of non-woven continuous filament fibers, instead of from relatively short chopped fibers. Rolls of non-woven continuous filament glass fiber mats are commercially available. For higher density preforms, 2-5 thickness of such non-woven continuous filament mats might be used. Sheets of the non-woven continuous filament fibers stretch considerably without breaking, and the fibers forming them are already coated with a thermoplastic resin. Hence, they are very suitable for use in making glass fiber preforms for RTM molding. They are especially suitable, and preferred, for another reason. The long fibers of such preforms tend to stay in place in the RTM mold during injection of the thermosetting plastic. Hence, "wash out" of reinforcing fibers from the gate area of the mold is considerably reduced. Accordingly, the resultant composite part is more likely to have intended strength and other characteristics, and is often preferred. On the other hand, a non-woven continuous filament fiber mat is inherently more expensive than an equivalent amount of chopped fiber. In addition, the mats have to be trimmed to a predetermined shape for use. This wastes some of the mat, which further adds to cost of the resultant RTM preform made from this starting material. One aspect of this invention involves reducing that waste, and thus reducing the cost of an RTM preform made of non-woven continuous filament reinforcing fibers.

This invention provides a means for reducing the cost of an RTM preform made from non-woven continuous filament strip material. Accordingly, this invention enables use of the preferred type of RTM preform to be more economically feasible. The manner in which this is accomplished is hereinafter described.

This invention also involves solving an additional problem associated with RTM molded composite parts. The additional problem is parallel elongated formations that occur on the surface of an RTM composite part. The parallel elongated formations are indentations and dark discolorations that are elongated in a direction perpendicular to the gate of the RTM mold. They give the surface a stripped appearance. The stripe-like indentations may only be slight, but they can often show through a specular automotive-type paint finish.

Considerable effort has been devoted to suppressing such anomalies on RTM composite parts. Various techniques

3 have been tried to eliminate the problem, mostly associated with improvements in mold gates and plastic injection procedures. Unfortunately, none of the efforts heretofore expended have been consistently successful.

On the other hand, this invention provides a technique by which such objectionable surface formations can be consistently eliminated. They are not only eliminated on the improved glass fiber RTM preforms of this invention but also on other glass fiber RTM preforms as well. Further, the objectionable glass fiber preforms can be substantially eliminated without changing the mold, without changing the plastic injection, or without changing any other molding parameter. Still further, the objectionable surface formations referred to above can be eliminated by a simple and inexpensive extension of an existing step in the current process of making the RTM preform.

The simple and inexpensive extension of a step in making the preform can be used on traditional preforms and on the less costly preform of this invention.

OBJECTS AND SUMMARY OF THE INVENTION

It is therefore an object of this invention to provide a less costly RTM preform made from non-woven continuous filament reinforcing material.

Another object of this invention is to provide improved methods of making an RTM preform, including an RTM preform made of non-woven continuous filament glass fibers, and especially including the less costly RTM preform described herein.

The less costly RTM preform of this invention comprises a special inner layer that is disposed between two outer layers of non-woven continuous filament reinforcing fiber. The special inner layer is made of small pieces of non-woven continuous filament reinforcing material, which pieces are cut from scraps of non-woven continuous filament material. The special inner layer is formed by substantially uniformly dispersing the pieces of continuous filament sheet material onto the surface of a first sheet or mat of continuous filament reinforcing fiber material. The special inner layer is then covered with a second sheet of continuous filament reinforcing fiber material. The resultant three layers are clamped together at their outer edges, heated and shaped.

According to a second aspect of this invention, clamped glass fiber sheets are heated for shaping of the preform. They can be heated at substantially usual temperatures but for at least about twice the normal and accepted time, perhaps 3–4 times the normal heating time. The heating is long enough to convert at least convert an outer sheet entire major surface from a generally white appearance to a light brown color. After shaping, the resultant RTM preform has at least its major surface of a generally light brown color, as opposed to a generally white, dark brown or black color. Ordinary RTM techniques can be used with the light brown RTM preform, to produce RTM composite parts having no parallel wave-type surface irregularities.

Other objects, features and advantages of the invention herein will become more apparent from the following description of preferred examples thereof and from the Drawing.

4

Figure 1:
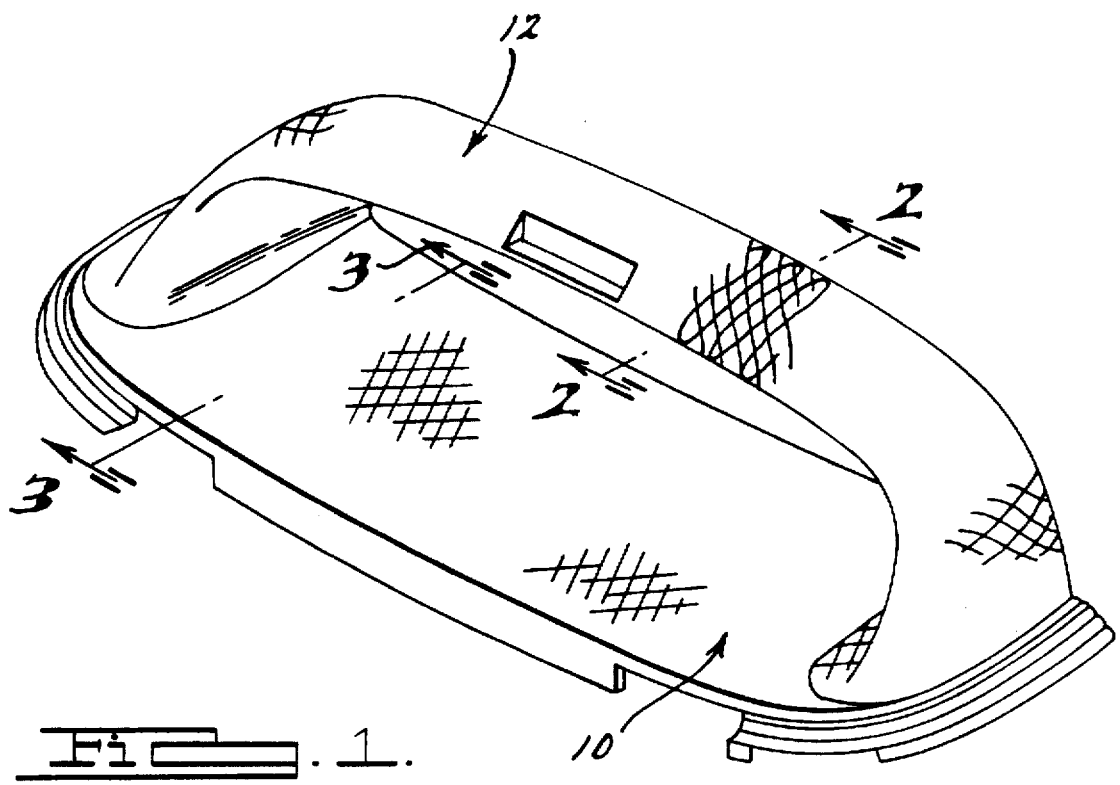
FIG. 1 shows a perspective view of a multipart RTM preform for the sport cap of a 1994 Chrysler Corporation Viper® automobile that includes this invention.
Figure 2:
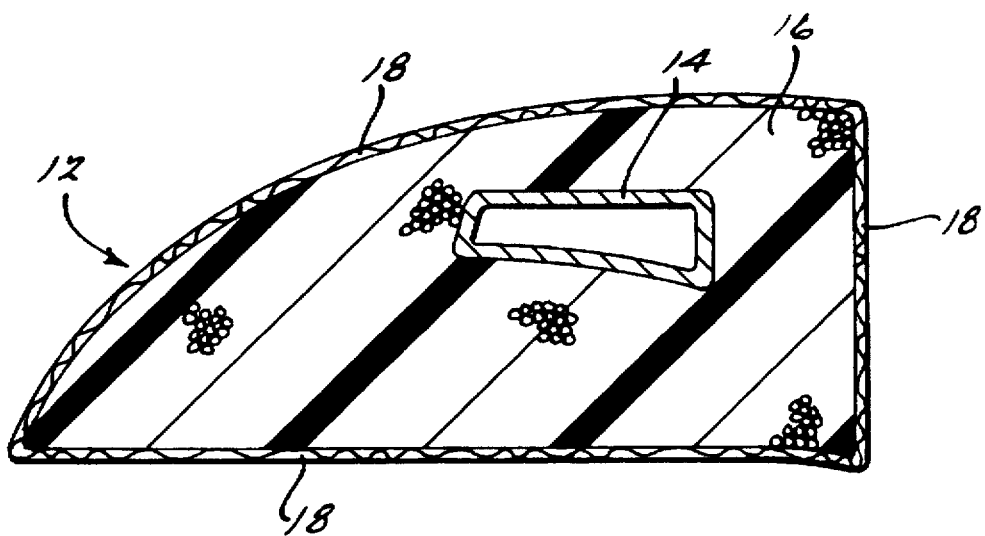

FIG. 2 shows a cross-sectional view along the line 2—2 of FIG. 1.

Figure 3:

FIG. 3 shows a cross-sectional view along the line 3—3 of FIG. 1.

Figure 4:
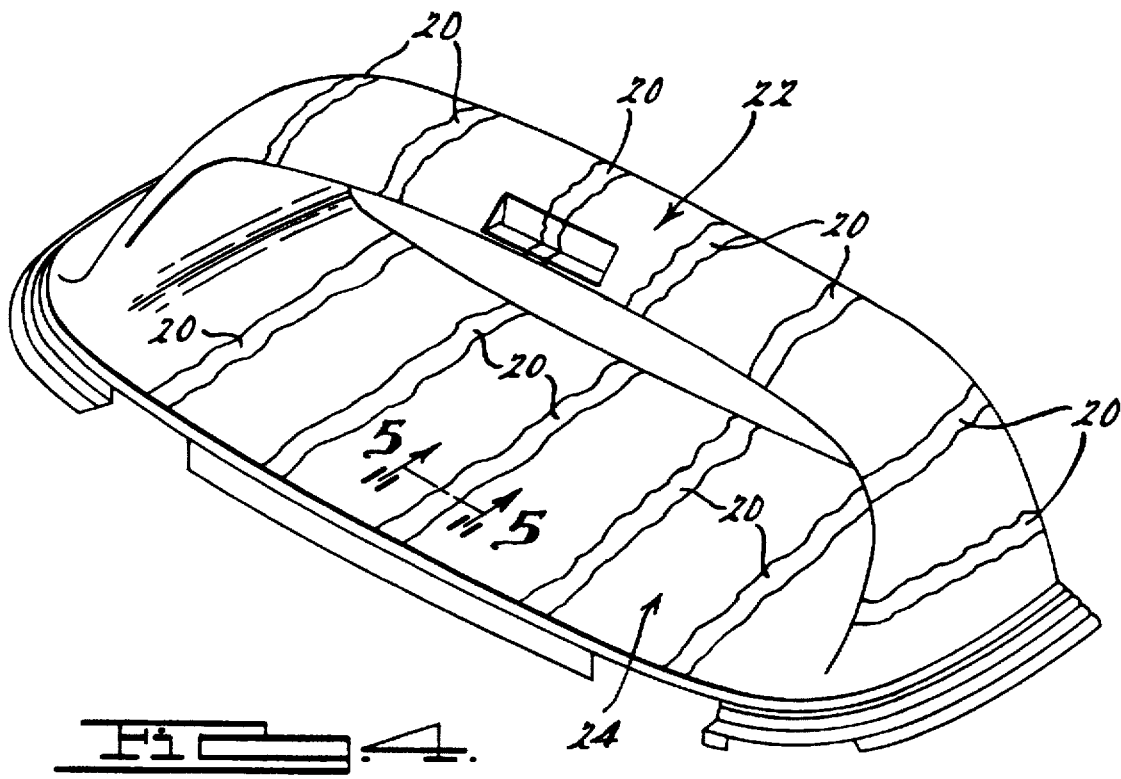

FIG. 4 shows a perspective view of the composite material sport cap of a 1994 Chrysler Corporation Viper® automobile as-molded, with exaggerated surface imperfections that can result from not using an RTM preform prepared in accordance with the second aspect of this invention.

Figure 5:
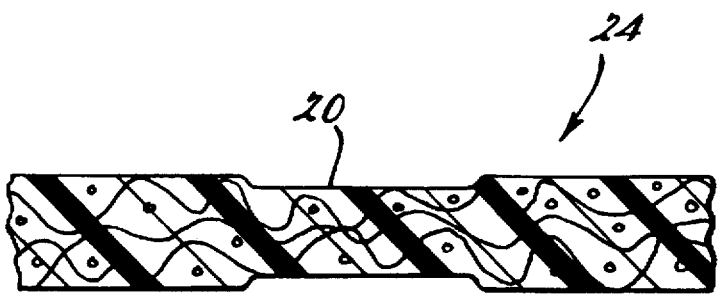

FIG. 5 shows a cross-sectional view along the line 5—5 of FIG. 4, that includes a showing of a surface imperfection in exaggerated depth.

Figure 6:
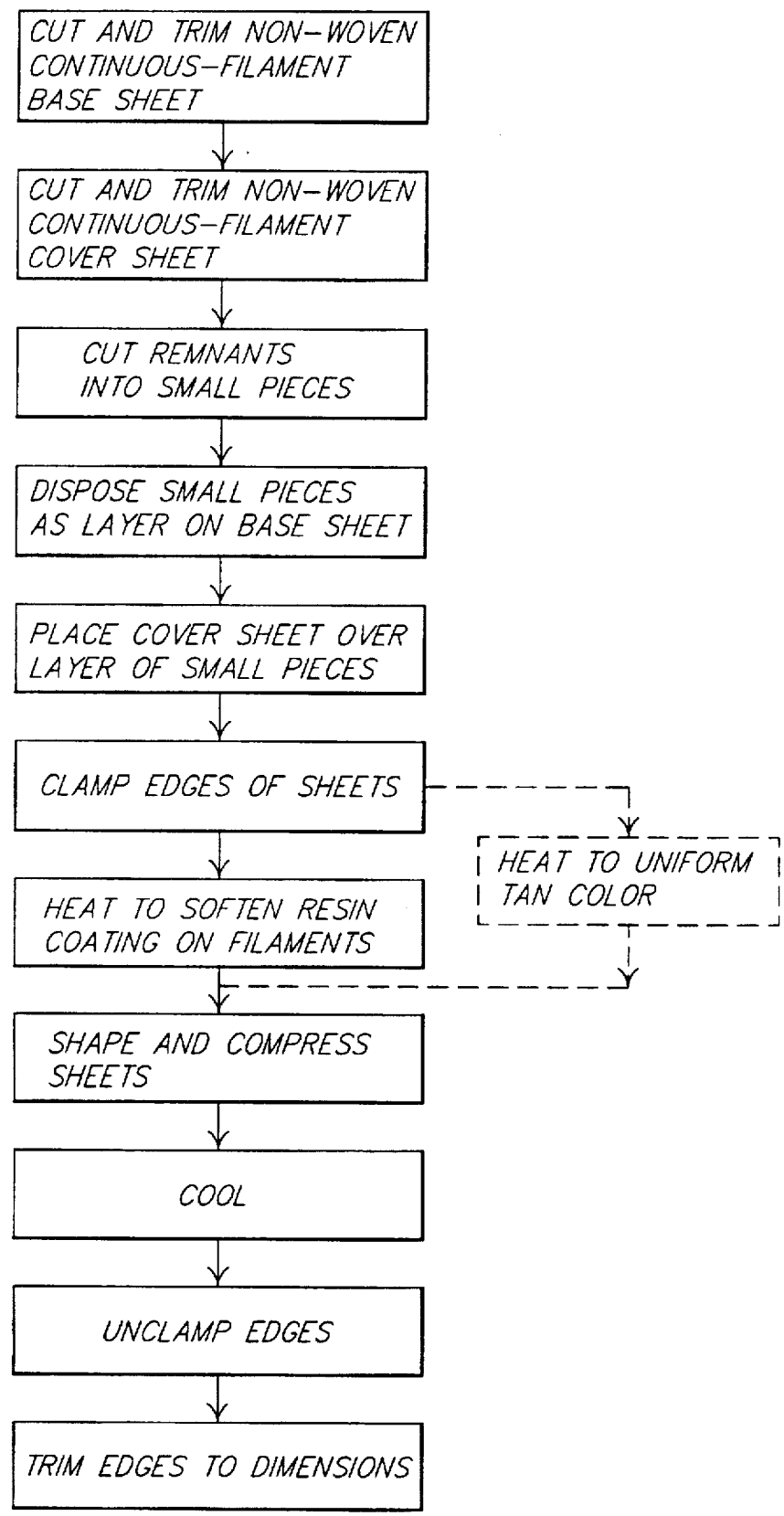

FIG. 6 shows a flow diagram illustrating an improved method of making an RTM preform in accordance with the first aspect of the invention, alone and in combination with the second aspect of the invention.

DETAILED DESCRIPTION OF THE PREFERRED EMBODIMENTS

As indicated above, one aspect of this invention involves the formation of a less expensive RTM preform made from a rolled strip of non-woven continuous filament reinforcing starting material. A second aspect of this invention involves heat treating the strip material in a special way to make an RTM preform. A complex example of an RTM preform made in accordance with both aspects of the invention is illustrated in FIGS. 1–3. The steps used to make such an improved RTM preform are diagrammatically shown in FIG. 6. FIGS. 4–5 schematically illustrate the detrimental surface effects that can result in an RTM composite part, if the RTM preform used to make the part has not been previously heat treated in accordance with the second aspect this invention. The pre-heat treatment provides benefits not only for the less expensive RTM preform of this invention but also other RTM preforms as well.

As indicated above, RTM means resin transfer molding. As used in this application, resin transfer molding means the molding of a thermosetting resin around a previously shaped reticulated reinforcing body. Such molding embeds the previously formed reticulated reinforcing body in a matrix of cured (i.e., hardened) thermosetting resin. The resulting RTM product is referred to herein as a composite product. The reticulated reinforcing body is referred to herein as an RTM preform. In most of the RTM processes and products contemplated in this invention, the RTM preform has an external configuration similar, if not identical to, the finished composite part. Hence, it substantially fills the RTM mold, and occupies substantially the length, width and thickness of the RTM composite product. Often, portions of it are visible on the surface of the RTM composite product as-molded. RTM composites and methods of making them are described in an editorial by Michael C. Gabrielle, Associate Editor, entitled "RTM Composites, What the Viper Project Taught Us", in *Plastics Technology* (March, 1994), which editorial is incorporated herein by reference.

Reference is now made to the first aspect of this invention. As indicated above, for higher strength automotive applications, non-woven continuous filament glass fiber sheet material is often preferred over chopped, i.e., directed, fibers as the reinforcing material in an RTM preform. The non-woven continuous filament glass fiber material is commercially available in rolled strip form in various widths and thicknesses. The rolled strip material can be generally described as a very open or low density material, that has a plurality of long, highly undulated strands of glass fiber generally randomly disposed on one another. The glass strands, also called fibers, in the non-woven continuous filament material have a coating of thermoplastic resin thereon. The thermoplastic resin coating binds the strands together at their points of contact, forming an elongated non-woven self-supporting strip of such continuous filaments. The undulations of the strands expand its thickness, to produce highly voided areas within the thickness of the resulting material. Many of the strands are generally longitudinally oriented along the length of the strip. A majority of the longitudinally oriented strands have a length at least several times the width of the strip. So do the transverse strands. Most of the generally longitudinal strands extend a substantial length of the strip. Many of the generally longitudinal strands will perhaps extend 50–100% of the length of the strip.

As indicated above, use of such non-woven continuous filament glass fiber material for RTM preforms is known. It is also known that such a material can provide increased strength over chopped the chopped, or directed, fibers. It is also known that use of such a material to form reduces "wash out" of the reinforcing fibers from the gate area of the RTM mold.

If one is to make an RTM preform from a such a material, the current practice is to unroll the strip and cut the strip into appropriate lengths. The cut lengths are referred to herein as sheets. Typically, 2–5 layers of such sheets will be used to make one RTM preform for an automotive composite product. The actual number of such sheets, that are stacked to make the appropriate starting thickness, will depend upon the thickness of the sheets and upon the weight of reinforcement material per unit area that is specified for the finished composite part.

Ordinarily, each sheet to be used in the preform is trimmed to the same peripheral configuration. The resulting pre-configured sheets are then stacked in register as a group. The group is peripherally clamped and supported in perimeter frame assembly. The grouped and clamped sheets are then heated, usually by moving them into an oven or other heating apparatus. The heating softens the thermoplastic resin coating on the fibers of the sheets. The warm clamped sheets are then pulled and/or pressed against a pattern, and concurrently cooled. Vacuum ports in the pattern can be used to help pull the sheets against the pattern, and to concurrently cool the sheets. The pressing and cooling bonds the sheets together to form a single body. It simultaneously imparts a three-dimensional shape to the body. The body is usually referred to as an RTM preform. Its shape generally corresponds in size, thickness, etc. to the size, thickness, etc. of the resultant RTM composite part that it will comprise.

FIGS. 1–3 shows an improved and more complex example of such an RTM preform. The FIGS. 1–3 preform includes a generally flat bottom portion 10 and an arched top portion 12. The precise configurations of these portions can be varied. The configurations shown are depicted as they are for simplifying illustration. By way of further example, each of the bottom and top portions could be formed separately, and then placed together in an RTM mold to form a unitary composite product.

The arched upper portion 12 comprises a central metal tube 14, of generally rectangular cross-section, that extends the length of the arch. The ends (not shown) of the tube can have flanges affixed thereto (also not shown) to assist in mounting of the resultant RTM composite part. A rigid closed cell foam 16, of polyurethane or the like, is molded around the metal tube 14. Compressed sheets of non-woven continuous filament glass fibers form an outer shell 18 that is preferably bonded to the outer surface of foam 16. The compressed sheets can be formed around foam 16 after foam 16 has been pre-molded around the metal tube 14. They can be formed in other ways as well, as one may prefer. The compressed sheets would be formed along the same lines as hereinafter described for the lower part 10 of FIG. 1.

In accordance with the first aspect of the invention, the lower part 10 of the FIG. 1 preform might be made as follows. If a weight of reinforcing fiber equal to only about three layers of the reinforcing sheets is needed, only two sheets would be cut from the rolled strip of non-woven continuous filament glass fiber material. Each of the two sheets would be trimmed to the same desired peripheral configuration. Then, one of the sheets, i.e., a first sheet, would be laid on a support. This forms the first layer of the resultant RTM preform. Then, small pieces of the same non-woven continuous filament material are dispersed onto the upper surface of that first sheet. The small pieces would squares about 1½ inch per side. They would preferably be dispersed as a generally continuous layer across the entire upper surface of the first sheet, without significantly extending beyond the edges of the first sheet. The layer of dispersed squares should be of generally uniform thickness, unless it was determined that selected areas of the surface should have a greater weight of reinforcing material. The layer of dispersed squares is then covered with the second sheet, with the edges of the second sheet registered with the edges of the first sheet. The second sheet, thus, forms the third layer of the group of registered layers. After the second sheet is placed on the squares, the edges of the group are peripherally clamped together with a perimeter frame assembly. Similar to the prior practice, the group is then heated. The clamped group of layers can be moved into an oven or into cooperation with some other heating apparatus.

In this first embodiment of the invention, heating is sufficient to at least soften the thermoplastic resin coating on the fibers of the sheets. As in the prior art, the group of layers are then shaped into a three dimensional body. Similar to what was described above, the group of layers is pulled and/or pressed against a pattern while still clamped and warm, and allowed to cool. This can be done with or without the aid of vacuum. The outer sheets help retain the squares of the middle layer in their relative places during shaping of the layers. This can be considered as if the outer layers help preserve the integrity of the middle layer during its shaping. Cooling of the layers while compressed against the pattern bonds the squares of the middle layer to each other and to the two outer layers. The result is the formation of the three-dimensionally shaped unitary body that is referred to herein as an RTM preform.

In cross-section, such an RTM preform does not readily reveal the inner layer or the small pieces which form it. Accordingly, no separate laminations are shown in RTM preform cross-sections shown in the Drawing.

The first aspect of this invention, thus, involves disposing pieces of the continuous filament non-woven material between two sheets of such a material to make an RTM preform. In other words, the first aspect of the invention involves upper and lower layers of non-woven continuous filament glass fiber sheets that are spaced by an intermediate layer of small pieces, or fragments, of such sheets. If only three layers are needed to obtain the required reinforcing weight per unit area, the upper and lower layers form opposed outer layers and the layer of small pieces forms an inner layer.

If a greater weight of reinforcing material is needed, than can be conveniently supplied by the afore-said three layers, an additional whole sheet of the continuous filament non-woven material can be added to the group. If still more weight than one sheet is required, a second whole sheet of the continuous filament non-woven material can be added. It would preferably be added to a major face of the group opposite from the face on which the first additional sheet was added. In the alternative, instead of adding a second whole sheet, one can add a second layer of the small pieces of the continuous filament non-woven material. The second layer of small pieces would be formed under the first additional sheet. It would be spaced from the first layer of small pieces by the whole sheet of continuous filament non-woven material covering the first layer of small pieces. These additional layers would form a four or five layer group that would be clamped, heated and shaped as indicated above.

As indicated above, if a second layer of small pieces is used, it should not comprise an outer layer in the group. It should be disposed between two whole sheets. For example, a five layer RTM preform could be made with first, third and fifth layers being formed of whole sheets and the second and fourth layer being formed of the small pieces.

In a preferred embodiment of this aspect of the invention, the small pieces of the inner layer are pieces cut from remnants of the whole sheets used in the RTM preform. As mentioned above, the whole sheets are cut from roll stock of the continuous filament non-woven material. The remnants are portions of whole sheets (comprising a group of layers) that were cut away when the whole sheets were trimmed to a predetermined peripheral configuration. In other words, this invention contemplates reclaiming remnants of non-woven continuous filament glass fiber strip material by using the remnants to make interior layers an RTM preform. As indicated above, the remnants are used by cutting them into small pieces, and then dispersing the pieces as a layer between two whole sheets of the non-woven continuous filament glass fiber material.

The remnants are cut or chopped into rectangular or square fragments of about 1–2 inches on a side, preferably about 1½ inches. Larger fragments can be used but are more difficult to uniformly disperse as a layer, except for extremely large pieces, as will hereinafter be explained. Smaller fragments can be uniformly dispersed but have shorter fibers. Fibers shorter than about one inch might not provide the desired reinforcing strength. Accordingly, for layers having only relatively small pieces, it is preferred that the small pieces be have maximum and minimum dimensions, perpendicular to their thickness, of about 1–2 inches, preferably about 1½ inches.

As indicated above, the small pieces of the continuous filament non-woven material are uniformly dispersed on a whole sheet of a group of layers. The small pieces form a continuous layer that covers substantially the entire upper surface of their supporting whole sheet. The small pieces are preferably randomly disposed in their layer, in a layer thickness that is generally only about one piece deep. In other words, most of the pieces in the layer would have a point of contact with each of the supporting whole sheet and a covering whole sheet. The actual measured thickness of this layer might vary, for example depending on where measured, the size of the pieces, and how the pieces were dispersed. The actual thickness can probably vary widely. On the other hand, the thicker the layer of small pieces, the more likely the layer will exhibit "wash out" at RTM mold gates. Accordingly, as a general rule it is preferred that the layer of small pieces be only about one piece deep. By this is meant that at least the majority of the small pieces in the layer, preferably more, will each have at least a point of contact with both the supporting sheet and the covering sheet. If it develops that insufficient remnants from the whole sheets forming the other layers in a given group are available to complete the inner layer, remnants from other trimmings could also be used. Analogously, if insufficient small pieces of the continuous filament non-woven material are not available, small pieces could be cut from the roll stock material itself.

Of course, one may even want to use a large patch of the continuous filament non-woven material as a substitute for the small pieces in selected areas of the middle layer. This may be desired for a variety of reasons. One reason might be that higher strength might be desired in a selected area. Another reason might be that a particular RTM mold causes wash out of the small pieces from the gate area of the mold during molding. If so, one might elect to substitute a patch in the middle layer (for the small pieces) near the gate area of the mold. The actual size of the patch used can also vary widely, depending on why it is used at all. For example if wash out of the small pieces is negligible, only a small patch may be used in the gate area of the middle layer.

In addition, I recognize that there may be applications where wash out of glass fibers in the gate area of the mold is not a particular problem. In such event, I recognize that one might be able to make satisfactory preforms by partially or fully shredding the patches before disposing them between the layers of continuous filament non-woven material. In fact, if wash out of the fibers is not a problem, shredding the patches into small groups of fibers, or even individual fibers, may even allow a more uniform dispersion of the fibers between the continuous filament non-woven sheets. Since the shredded fibers still each have a coating of the thermoplastic resin thereon, they will have improved bonding properties over the more common types of "directed" fibers, which have only particles of thermoplastic adhering to the fibers, or fibers of thermoplastic material mixed in with the glass fibers. The use of the shredded continuous filament non-woven material for the middle layer, instead of whole patches, is still considered to be within the scope of this invention.

As one might expect, the glass fiber sheets or mats can be heated in any convenient manner, including direct radiant heating or heating by convection. Heating of the grouped and clamped layers can be done by heating the sheets or mats just before forming, heating the ambient for the pattern, and/or heating the pattern or mold itself. Hence, while not normally done, it is conceivable that the heating and shaping might be substantially concurrently done.

Typically, the grouped and clamped layers comprising the RTM preform are heated before shaping. The precise amount and rate of heating in the past has not been particularly critical. Usually, the amount of heating has been determined empirically. For example, enough heat was applied to make the resin coated glass fibers stick together during shaping of the layers but not so much as to degrade the resin coating on the fibers. The resin coating is of a thermoplastic, as herein before indicated. It was previously thought that the thermoplastic resin coating degraded if it discolored during heating. Accordingly, if the sheets were significantly discolored when heated, or even significantly tinged with a light brown or tan color, it was believed that the resin coating on the fibers had degraded. RTM preforms made with such sheets were not considered satisfactory for use in RTM processes.

By way of example, sheets used in forming an RTM preform such as shown in the drawing might have only been previously heated for about 40–60 seconds. When heated in accordance with this second aspect of the invention, they are heated about 180–300 seconds. This is not just twice as long. It is at least three times as long, and is up to about 7–8 times as long.

The actual heating time needed to soften the resin is, of course, a function of the cumulative thickness of the sheets used and the rate at which the sheets are heated. The rate of heating is, in turn, a function of the temperature of the oven, heater, etc. Often, especially for large sheets such as used as RTM preform for automotive body parts, the temperature of the heat source is not known or readily measurable. Accordingly, it is often the practice to determine the proper amount of heating time by trial and error for any given heat source. The proper amount of time would be the amount of time that would soften the resin on the glass fibers but would not significantly discolor the outer major surfaces of the glass fiber sheets.

The foregoing references to conventional heating practices introduce the second aspect of this invention. In the second aspect of this invention, the clamped sheets are heated until the outer sheets, at least, discolor entirely across their face. The discoloration from heating is not necessarily uniform across a given face or surface. It often somewhat varies in tone, or shading, across a given face or surface. It could also be referred to as tan. It appears that virtually any shade of light brown is satisfactory, even if the surface appears generally variegated in tones of brown. The particular shading or tone of the light brown discoloration is apparently not particularly critical in this invention. All such shadings, tones and variegations are probably at least generally satisfactory, so long as they do not have a dark brown or black general appearance. This is what is meant herein by a light brown or tan appearance.

Such light brown discoloration is believed to also extend below the surface of the outer layers of the preform, if not entirely through the thickness of those layers. It may also extend through the thickness of any inner layers as well. Contrary to prior opinion, when the glass fiber layers are so discolored by heating prior to RTM preform shaping, the resultant RTM preform is not only satisfactory but actually provides improved RTM molding properties not heretofore recognized.

When the clamped glass fiber sheets are heated until the outer sheets turn a light brown across their entire face, a unique improvement occurs in the RTM composite part made with an RTM preform made from such sheets. The composite part does not exhibit wave-like surface irregularities that often emanate from gate areas of the mold. These wave-like surface irregularities are indicated by reference numeral 20 in FIGS. 4 and 5.

More specifically, FIGS. 4 and 5 show an RTM composite part after molding and trimming but before painting. The composite part of FIGS. 4–5 includes an arched upper portion 22 and a generally flat lower portion 24. The FIGS. 4–5 part could be made with an RTM preform such as described in connection with FIGS. 1–3. The RTM preform could be made conventionally, or made in accordance with the first aspect of this invention. In either event, if the glass fiber layers used to form the RTM preform are conventionally heated prior to shaping, the wave-like surface defects 20 can occur in the resulting RTM composite part. The surface defects 20 are very shallow surface imperfections that appear to emanate from the gate areas of the RTM mold in which the composite part was formed. They not only show up as an appearance difference on the surface of the as-molded part but, as indicated above, actually have a small surface contour. The contour is a wave-like irregularity of alternating up and down surface variations. FIG. 5 shows a "down" surface irregularity in exaggerated depth, to better emphasize the surface defect.

When the wave-like surface irregularities are shallow enough, they can effectively be masked by the usual paint coatings applied over them. On the other hand, it is not unusual for the wave-like surface irregularities to have a height and/or depth that cannot be masked by the usual painting procedures. In such instance, extensive manual surface refinishing is required to remove and/or fill the surface irregularities, so that they do not impair the painted finish. It should be mentioned that where RTM composite products are used for automotive body panels, surface finish has to be near specular to be satisfactory. In such finishes, even slight surface variations can be noticed, and thus be objectionable.

The second aspect of this invention prevents such wave-like surface irregularities from forming, at least when continuous filament non-woven glass fiber material is used as the reinforcing material. It is believed that the invention is also applicable to directed glass fiber reinforcing material. It is not clearly understood what causes the surface irregularities or why the second aspect of this invention suppresses them. Nonetheless, they are suppressed. They are suppressed by a simple extension of the heating step normally used to warm the glass fiber sheets prior to shaping of the RTM preform.

In this second aspect of the invention, the clamped group of glass fiber layers are heated longer that usual. Before heating, the glass fiber layers are generally white in coloration. In a preferred embodiment of this second aspect of the invention, the glass fiber layers (there are usually more than one) are heated at normal hating temperatures for an extended length of time. By extended is meant that heating at normal and accepted temperatures is for a longer period than was previously considered satisfactory. Accordingly, the glass fiber layers are "over" heated, by prior art standards. The glass fiber layers are heated until the outer surfaces of the glass fiber sheet or sheets turn a light brown or tan substantially entirely across their exposed faces. Then, while still warm, they are shaped into an RTM preform in the usual manner.

It has been found that time of heating must be more than that which will only tinge the edges of the exterior surfaces of the layer or layers, or more than that which will cause merely a tan streak to form across an exposed surface. That whole external surface, at least the one exposed directly to the heat source (if the heat source is directed only toward that surface) has to be discolored. On the other hand, the heating should not be so long as to produce any substantial dark browning, or blackening, of the sheets. If so, it appears that the objectionable surface wave irregularities in the resultant RTM composite part can be suppressed. However, the thermoplastic resin coating on the glass fibers used make the RTM preform apparently has not degraded significantly. It at least as not degraded enough to be objectionable. In summary, heating of the sheets to a point of general surface discoloration prior to shaping, seems to consistently prevent the wave-like surface irregularities in the resulting RTM composite parts, without objectionably deteriorating cohesion of the resin coated glass fibers of the RTM preform.

As to the type of heating that can or should be used to effect the discoloration, any of the normal and accepted types and sources of heating can be used. In other words, any of the normal and accepted heating temperatures can be used. Only the time of heating need be extended with such types of heating. On the other hand, it is to be understood that if a shorter heating time were desired, higher heating temperatures could probably be used to produce the discoloration.

For completeness of disclosure, one example is hereinafter given of the manner in which an RTM preform is incorporated into an RTM composite product, whether the RTM preform has been made in accordance with the first and/or the second aspect of this invention. As mentioned above, the RTM preform is a rigid reticulated porous body composed of glass fibers that are bonded together with a thermoplastic resin. The body was shaped warm on a pattern, cooled and then given a final trim for incorporation into an RTM composite part.

The RTM preform is incorporated into an RTM composite part by placing the RTM preform in an RTM mold. The mold has a cavity that corresponds in size and shape to the RTM preform. In other words, the RTM preform substantially, if not actually, fills the mold cavity. Accordingly, substantially the entirety of the preform's major surfaces are clamped in place between facing surfaces of the mold. However, as indicated above, the RTM preform is a reticulated very porous body. When thermosetting plastic is injected into the mold cavity from the mold gates, the plastic flows through the interstices of the RTM preform. The plastic fills voids in the RTM preform and forms a composite product having a hard continuous outer surface. If the RTM preform was heat treated in accordance with the second aspect of this invention, the hard outer surface of the composite part is also specularly uniformly smooth in all significant areas.

The non-woven continuous filament glass fiber material on the outer surface of the RTM preform makes the RTM preform durable during handling prior to its incorporation into an RTM composite product. The squares of such material are resistant to wash-out during molding because they are used as an interior layer. Such a material provides a strong reinforcement in an RTM composite product.

While the above description constitutes the preferred embodiment of the invention, it will be appreciated that the invention is susceptible to modifications, variations, and changes without departing from the proper scope or fair meaning of the accompanying claims. For example, benefits of the second aspect of this invention, which is the extended heating step, are expected to also be achieved when making RTM preforms with directed glass fibers.

I claim:

1. A method of making an economical multilayer preform of reinforcing fibers, for use in making a resin transfer molded article, said method comprising the steps of:

disposing a layer of relatively short reinforcing fibers between two adjacent sheets of continuous-filament reinforcing fibers that have highly voided areas, to form a heterogeneous combination of unbonded layers with highly voided areas, substantially all reinforcing fibers in each sheet having a coating of thermoplastic resin thereon; and thereafter shaping said heterogeneous combination of layers into a mesh body, said mesh body having voided areas and a configuration of compound curvature corresponding generally to a composite resin transfer molded article that is to be reinforced with such mesh body, said shaping of said mesh body occurring by steps that include heating to bond said fibers together at points of contact thereof by means of said resin coating on said fibers.

2. The method of claim 1 wherein:

the reinforcing fibers are of glass;

the short fibers have an average length of about 1–2 inches;

the short glass fibers also have a layer of thermoplastic resin thereon; and said shaping of said heterogeneous layers into said mesh body includes heating the layers to soften the resin coating on said fibers, compressing the layers, and cooling the layers while so compressed, whereby fibers in said layer and sheets are bonded together at their points of contact by said resin coating on said fibers to form a reticulated reinforcement body for subsequent inclusion in a composite plastic article.

3. The method of claim 2 wherein:

the layer of short glass fibers is a layer of small pieces of continuous filament non-woven glass fiber material, in which fibers of each piece are resin coated and prebonded together.

4. The method of claim 3 wherein:

the small pieces have an average maximum dimension of about 1–2 inches.

5. The method of claim 3 wherein:

the small pieces have an average dimension of about 1–2 inches; and the majority of said small pieces are cut from remnants of continuous filament non-woven glass fiber material.

6. The method of claim 1 that includes:

trimming at least one sheet of continuous filament non-woven glass fiber material to a predetermined configuration before disposing said layer of short fibers between said sheets, whereby trimmings are formed;

cutting the trimmings into small pieces having an average maximum dimension of about 1–2 inches, whereby prebonded clusters of short glass fibers are formed;

supporting a first trimmed sheet of continuous filament non-woven glass fiber material in substantially horizontal disposition to receive the layer of short fibers;

disposing said clusters of short glass fibers as a layer on said first trimmed sheet; and covering said layer of short glass fibers with a substantially registered second trimmed sheet of continuous filament non-woven glass fiber material, whereby said heterogeneous combination of unbonded layers is formed.

7. The method of claim 6 wherein:

said layer of small pieces has a thickness in which a majority of said small pieces have at least a point of contact with both of said first and second sheets.

8. The method of claim 7 wherein:

at least one additional sheet of continuous filament non-woven glass fiber material is disposed in register with said first and second sheets to form a heterogeneous combination of at least four layers.

9. The method of claim 8 wherein:

an additional layer of prebonded short glass fiber clusters is disposed under each such additional continuous filament glass fiber sheet in said heterogeneous combination of layers.

* * * * *